(12) United States Patent
Mayer et al.

(10) Patent No.: US 6,382,011 B1
(45) Date of Patent: May 7, 2002

(54) APPARATUS FOR PROVIDING LEAKAGE CALIBRATION IN PACKAGES

(75) Inventors: Daniel W. Mayer, Wyoming; Mark D. Evans, West St. Paul; Craig K. Loebig, Monticello, all of MN (US)

(73) Assignee: Mocon, Inc., Minneapolis, MN (US)

(*) Notice: Subject to any disclaimer, the term of this patent is extended or adjusted under 35 U.S.C. 154(b) by 0 days.

(21) Appl. No.: 09/852,250

(22) Filed: May 9, 2001

(51) Int. Cl.[7] ............................................... B01N 21/00
(52) U.S. Cl. ....................................................... 73/1.06
(58) Field of Search ................................ 73/1.06, 1.16, 73/1.57, 865.6, 40.7, 49.3

(56) References Cited

U.S. PATENT DOCUMENTS 3,956,923 A * 5/1976 Young et al. ................. 73/49.3
5,777,203 A * 7/1998 Stymne ....................... 73/40.7
5,850,036 A * 12/1998 Giromini et al. ............ 73/40.7

* cited by examiner

Primary Examiner—Robert Raevis
(74) Attorney, Agent, or Firm—Paul Sjoquist

(57) ABSTRACT

A plug for providing a predetermined flow rate of leakage gas from a sealed package for purposes of calibration of gas measurement instruments, the plug having an axial passage therethrough with a threaded interior wall; and a bolt for threading into the plug axial passage, the bolt having an axial passage therethrough, and an insert for insertion into the bolt axial passage, the insert having a predetermined size opening for permitting only a predictable flow of leakage gas through the plug.

12 Claims, 2 Drawing Sheets

APPARATUS FOR PROVIDING LEAKAGE CALIBRATION IN PACKAGES

BACKGROUND OF THE INVENTION

The present invention relates generally to devices for measuring gas leakage from sealed packages of various types, usually made from plastic film or molded plastic. More particularly, the invention relates to a device for providing a "calibrated leak" to a package, which means that the invention, when applied to a package, allows a predetermined and precise amount of leakage from the package. The usefulness of the invention lies in the fact that it enables leak measurement equipment to receive a predetermined and known precise amount of leakage gas, thereby to permit calibration of the leakage measurement equipment to the known leakage. Once the leakage measurement equipment has been calibrated using the invention, subsequent packages can be measured to provide an accurate measure of the leakage from each subsequent package.

The invention relates particularly to the type of packaging described in copending U.S. application Ser. No. 09/845,914, entitled "Multi-port Gas Leakage Measurement Fixture," filed Apr. 30, 2001, owned by the assignee of the present invention, and packages similarly constructed of plastics for the purpose of holding articles in a confined and relatively sterile, isolated environment.

It is a principle object of the present invention to provide a calibration tool for the measurement equipment which provides a measure of leakage from packages and the like.

It is another object of the present invention to provide a calibration tool which can be used by a variety of gas leakage equipment to provide a standard basis for calibrating all such equipment, thereby to provide measurement data which is valid for a number of different types of measurement equipment.

An advantage of the present invention is that it provides a quick and consistent calibration technique for many different measurement devices which might be in use at the same time, and thereby ensures that all such devices are providing data of the same or very similar accuracy.

Other and further objects and advantages of the invention will become apparent from the following specification and claims and with reference to the appended drawings.

SUMMARY OF THE INVENTION

A device for attachment to a package, including a deformable plug for insertion through a hole in the package, a bolt threadable into the plug, to cause deformity and sealing of the plug against the package wall as the bolt is tightened; the bolt has an axial passage which joins to a side passage through the head of the bolt, and an insert having a predetermined-size leak opening is press-fit into the axial passage. The insert has alternative forms: one form comprises a jewel such as sapphire having a precise hole drilled through it; a second form comprises a capillary tube having a precise internal diameter and a predetermined length.

DESCRIPTION OF THE PREFERRED EMBODIMENT

Figure 1:
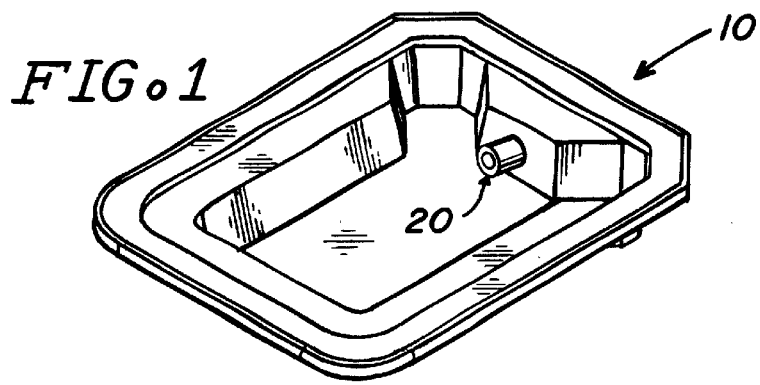
FIG. 1 shows a typical plastic container of the type which is tested by the invention.

Referring to the drawing figures, In the figures, like reference characters refer to the same or functionally similar parts of the respective components illustrated in each of the figures. FIG. 1 shows an isometric view of a typical plastic tray 10 for holding a sterilized product, with a deformable plug 20 inserted through a hole made in the tray's side wall. The tray 10 would normally have a sealed cover (not shown) over the top open area, and a product of a particular type (not shown) inside the tray volume. The deformable plug 20 is used merely for calibrating the test equipment which is used to measure the amount of gas leakage which emanates from the package and the package seals. The test equipment and the process for testing is disclosed in co-pending patent application, Ser. No. 09/845,914, filed on Apr. 30, 2001, and entitled "Multi-port Gas Leakage Measurement Fixture."

Figure 2:
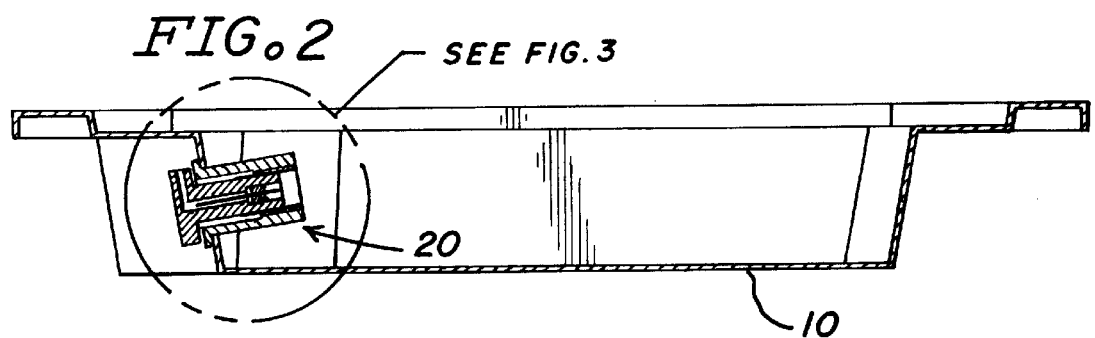
FIG. 2 shows a side view in cross section of the container of FIG. 1.
Figure 3:
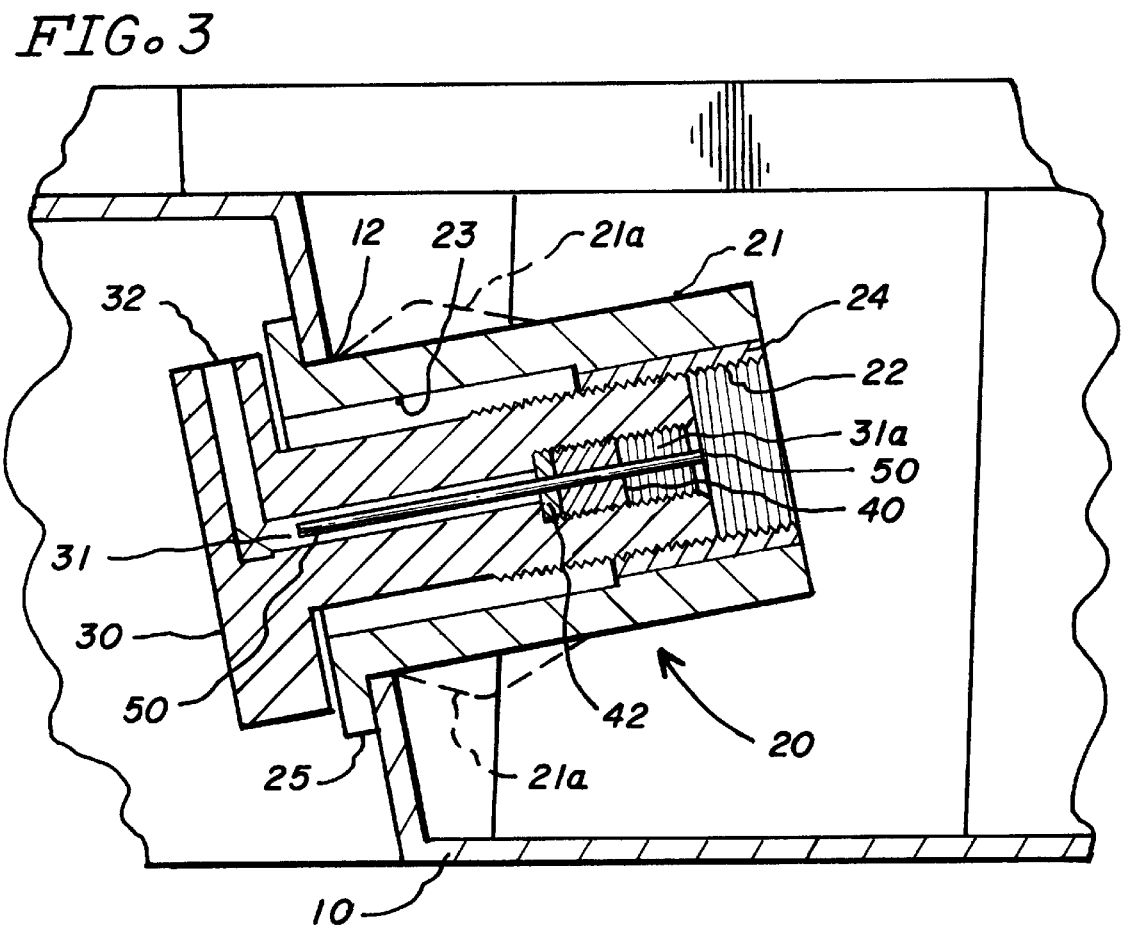
FIG. 3 shows an expanded portion of FIG. 2.

FIG. 2 shows a side elevation view in cross-section, along a line bisecting the length dimension of the package. FIG. 3 shows an exploded portion of the view of FIG. 2, showing the plug 20 in cross-section view. Plug 20 has an outer deformable body 21 which is sized to be press-fit through an opening 12 made through a side wall of package 10. When it is inserted as shown in FIG. 3, the outer body forms a leak-tight seal against the package 10 side wall.

Plug 20 has an interior threaded bore 22, which may preferably be formed by an internally-threaded, press-fit metal sleeve insert 24, which is pressed, through a central passage in housing 21 and is fixedly held in position inside housing 21. The central passage in housing 24 has an enlarged diameter portion 23 through its top end, and a flange 25 which is sealably positioned against the package 10 side wall.

A threaded bolt 30 is inserted into the threaded bore 22, and bolt 30 may be tightened against the flange 25 to provide a leak-tight fit. Tightening of the bolt 30 causes the plug 20 to deform and bulge outwardly as shown by the dotted outline 21a, thereby creating a tight seal against the wall of tray 10. The bolt 30 has an axial central passage 31 which opens through the bottom end of bolt 30, and has a radial passage 32 which joins the passage 31 and opens through an outer edge of bolt 30. The bottom portion 31a of passage 31 is of enlarged diameter. An insert 40 is sized for press-fit insertion into the passage 31a. Alternatively,passage 31a may have an internal threaded portion which is engageable against a similarly threaded portion of insert 40, as shown in FIG. 3. An O-ring 42 is compressed between the bottom end of insert 40 and the shoulder formed at the junction of passage 31a with the smaller diameter passage 31. Insert 40 has an axial bore sized to receive a capillary tube 50, which is sealed against leakage by the compressed O-ring 42.

In operation, the assembly of deformable housing 21 is pressed into opening 12, the insert 40 is tightly engaged into the passage 31a in the bolt 30, and the bolt 30 is tightly threaded into housing 21 so as to create only a single leakage path; namely, a leakage path through the capillary tube 50 internal opening. Capillary tube 50 is typically chosen to have a length of about ¼ inch to about ½ inch and a bore of about 5 mils (0.012 cm). It is possible to mathematically predict the volume flow rate of a gas through the capillary tube by using Poiseuille's Law, which is $$V=\pi p r^4/8L\eta$$

where v=volume flow rate;

P=pressure differential across the tube ends;

r=radius of tube

L=length of tube

π=3.14159

η=coefficient of viscosity

For a given set of test conditions, all of the foregoing can be measured or determined from reference materials, and therefore the volume flow rate can be predicted. If a plug construct having the defined test parameters is used with the test equipment and test procedures described in the aforementioned co-pending patent application, the test equipment can be calibrated to display the predicted volume flow rate. Thereafter, the equipment and test procedure can be used to accurately measure the volume flow rate of leaks in other packages having similar designs.

Figure 4:
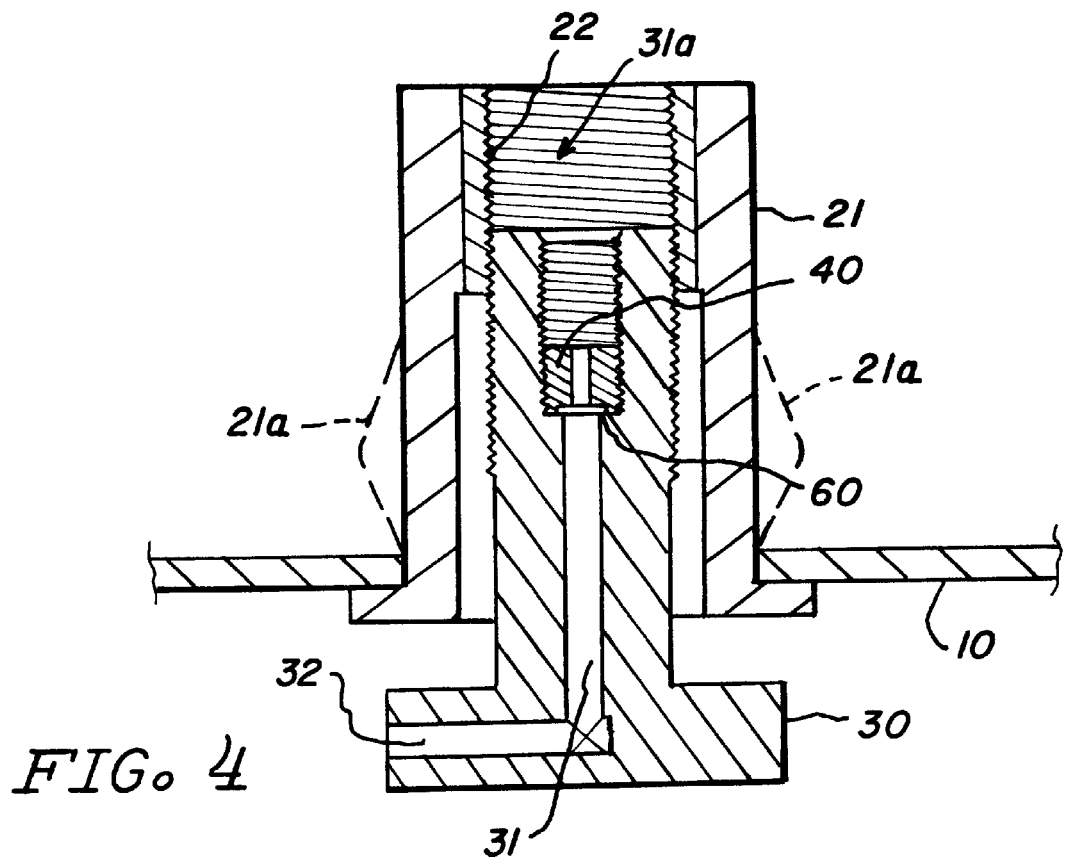
FIG. 4 shows an alternative form of the invention in cross section.
Figure 5:
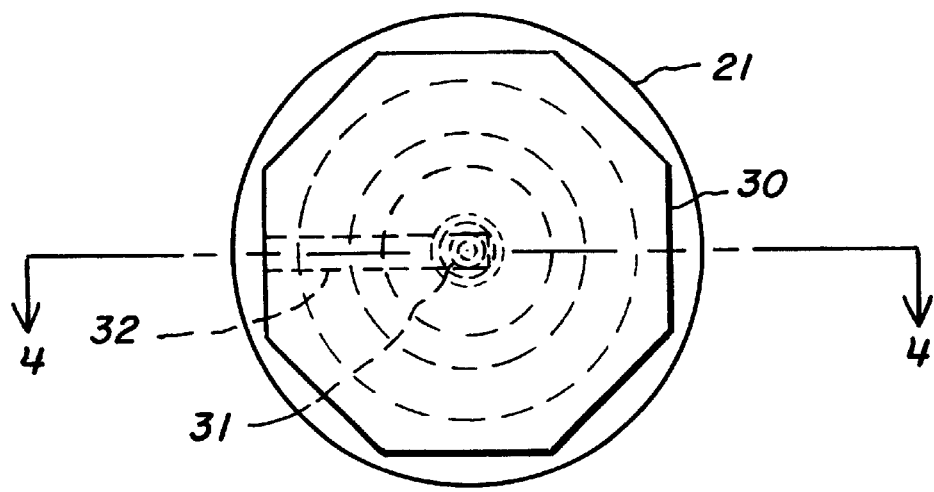
FIG. 5 shows an end view of the device of FIG. 4.

An alternative embodiment of the invention is illustrated in FIG. 4 and FIG. 5. In this alternative, the volume flow rate of a pinhole leak can be simulated, as contrasted with the volume flow rate of a capillary tube which has been described previously. Referring to FIG. 4, which is a cross-section view taken along the lines 4—4 as shown in FIG. 5, the insert 40 is used to clamp a jewel 60 having a predefined orifice size at the bottom of passage 31a, so that leakage can occur only through the orifice in the jewel 60. FIG. 5 is an end view of the invention, with the passages 31 and 32 shown in dotted outline. In this embodiment, the volume flow rate can be predicted for any size orifice, using Poiseuille's Law, as described above. Because the length of the orifice passage is shorter than that of a capillary tube, the volume flow rate through the orifice will be somewhat higher for the same size orifice as is used for the capillary tube diameter.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for providing a controlled gas leak through an opening in an otherwise sealed package, comprising:

a) a plug made from a deformable, resilient material, sized for sealable insertion through said opening, said plug having an axial passage therethrough and a threaded portion in said axial passage;

b) a threaded bolt sized for engagement in said plug threaded portion, and having a head sized to sealably cover said plug axial passage, said bolt having a bolt passage therethrough; and c) an orifice of predetermined size inserted in said bolt passage, whereby the leakage gas flow rate from said package is controlled by the size of said orifice.

2. The apparatus of claim 1, wherein said passage through said bolt further comprises an axial portion beginning at the bolt threaded end, and a radial portion joining the axial portion and opening through said bolt head.

3. The apparatus of claim 2, wherein said bolt axial passage portion further comprises an enlarged diameter portion beginning at the bolt threaded end, and a reduced diameter portion joining said radial portion, said enlarged diameter portion having an interior wall.

4. The apparatus of claim 1, wherein said interior wall portion of said plug axial passage further comprises a metallic sleeve pressed into said axial passage.

5. The apparatus of claim 4, wherein said orifice further comprises a jewel member having a predetermined size drilled hole therethrough.

6. The apparatus of claim 4, wherein said orifice further comprises a capillary tube of predetermined length and internal diameter.

7. An apparatus for calibrating a gas measurement instrument which measures leakage gas flow rate from a sealed package, by providing a predetermined flow rate of leakage gas from the package, comprising a) a deformable plug adapted for tight insertion into a preformed opening through a wall of said package, said plug having an axial passage therethrough, a first portion of said axial passage having an enlarged diameter, and a second portion of said axial passage having a reduced diameter and a threaded interior wall; a shoulder being formed at the juncture of said first and second passage portions;

b) a threaded bolt sized for engagement into the threads of said plug reduced diameter portion, and having a head sufficiently large so as to sealably cover said plug first passage portion; said bolt further comprising an axial passage partially through said bolt, and a radial passage joining said bolt axial passage and opening through the head of said bolt; said bolt axial passage further comprising a first passage portion having an enlarged diameter and an interior wall, and a second passage portion having a reduced diameter portion, with a shoulder being formed at the juncture of said first and second passage portions; and c) an insert plug having an exterior wall portion sized to engage the interior wall of said bolt first passage portion, and having an axial opening therethrough of predetermined size, whereby to permit a predetermined rate of flow of leakage gas through said bolt passages.

8. The apparatus of claim 7, wherein said insert plug further comprises a jewel member sealed into said axial opening, said jewel member having an orifice of predetermined size, thereby forming a narrowed passage portion through said axial opening.

9. The apparatus of claim 8, wherein said jewel further comprises a sapphire jewel.

10. The apparatus of claim 8, wherein said jewel is clamped against said shoulder in said bolt axial passage.

11. The apparatus of claim 7, wherein said insert plug further comprises a tube sealably confined inside said axial opening, said tube having a predetermined length, less than the length of said bolt axial passage, and having a predetermined internal diameter.

12. The apparatus of claim 11, further comprising an O-ring seal clamped between said insert plug and said shoulder in said bolt axial passage.

* * * * *